Aug. 22, 1950 — R. M. SMITH — 2,519,857
CINCH STRAP ACCESSORY
Filed April 18, 1949 — 2 Sheets-Sheet 1
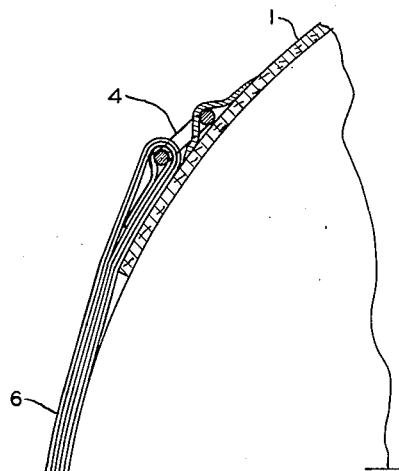
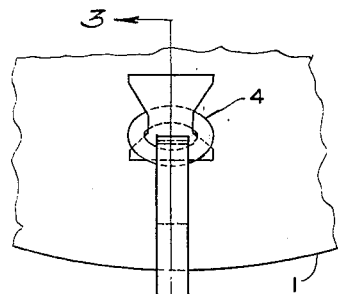
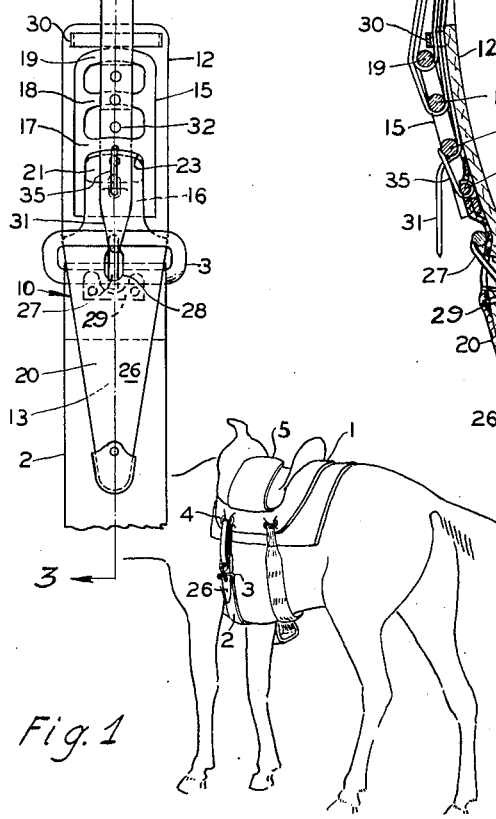
INVENTOR.
Robert Michael Smith
BY Leslie M. Hansen
HIS ATTORNEY Aug. 22, 1950   R. M. SMITH   2,519,857
CINCH STRAP ACCESSORY
Filed April 18, 1949   2 Sheets-Sheet 2
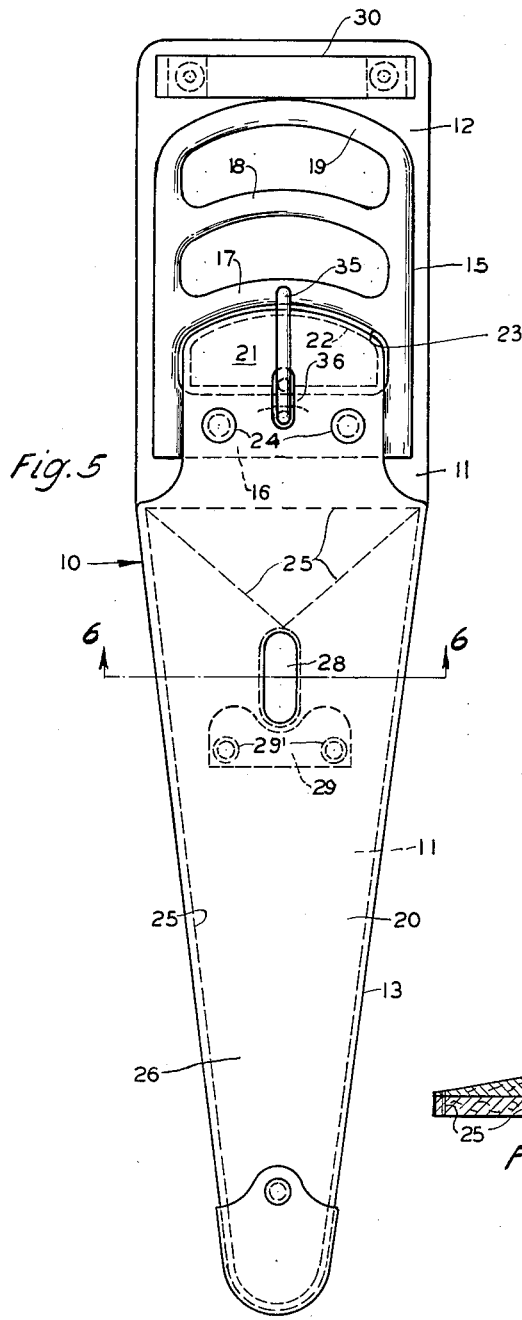
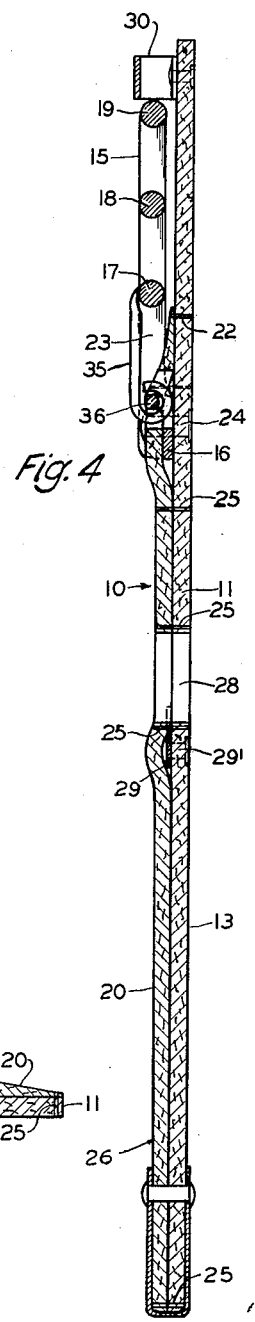
INVENTOR.
Robert Michael Smith
BY
Leslie M. Hansen
HIS ATTORNEY Patented Aug. 22, 1950

2,519,857

UNITED STATES PATENT OFFICE 2,519,857

CINCH STRAP ACCESSORY

Robert Michael Smith, Palo Alto, Calif.

Application April 18, 1949, Serial No. 88,167

5 Claims. (Cl. 54—46)

1

This invention relates to saddlery and more particularly to an article of manufacture forming an accessory for saddle rigging.

Various types of saddles have come into use, each for a particular purpose. The Western, or Cowboy saddle being more essential for work has become a tool of the art of cowpunching and is provided with many features compatible with that purpose. The pommel, for instance, is used as a snubbing post during the capture of a lassoed calf, steer or colt. The horse, in turn, utilizes the saddle structure as a means of keeping the lasso rope taut to thereby assist the dismounted cowboy in quickly apprehending the captured animal.

It will therefore be apparent that the manner of attaching the saddle to the horse is of utmost importance. The present invention contemplates the provision of a latigo attaching billet for securing the saddle to a horse in a simple, yet effective manner.

Another object of this invention is to provide a girth strap linkage which effects the saving of time and labor in the mounting and demounting of the saddle.

Another object is to provide a non-galling attachment for the girth strap of saddles.

Another object is to provide a girth strap cinching accessory which is smooth of surface for assuring against hair pulling or pinching of the horse's flesh in addition to the attainment of greater comfort to the rider.

These and other objects and advantages will become apparent from the following description when read in the light of the drawings in which:

Fig. 1 is a general view of a saddle in place upon a horse and disclosing the present invention.

Fig. 2 is an enlarged elevation of that portion of the saddle of Fig. 1 embodying the invention.

Fig. 3 is a section of Fig. 2 taken along line 3—3 thereof.

Fig. 4 is an enlarged section of that portion of the present invention disclosed in Fig. 3.

Fig. 5 is an elevation of the device shown in Fig. 4.

Fig. 6 is a cross section of Fig. 5 taken along line 6—6 thereof.

Referring now to Fig. 1 in which the mounting side of the animal is portrayed, 1 is the saddle tree which overlaps the back of the horse and 2 is the girth strap by which the saddle is secured to the horse.

As is well known, the girth 2 is suitably anchored to the saddle tree on the offside thereof which is not seen in Fig. 1 and when the saddle tree is placed upon the horses's back, the free end of the girth strap hangs from its aforementioned anchorage. The free end of the girth 2 is provided with a girth ring 3 and is to be attached to a rigging ring 4 secured to the saddle tree 1. During attachment of the girth to the rigging ring, the skirt 5 of the saddle is thrown back over the seat thereof so as to enable a person to make a good connection between these rings 3 and 4.

Ordinarily, the connection between rings 3 and 4 is made by a strap 6, called the latigo, having one end thereof secured in the customary manner to the rigging ring 4. This latigo 6 is of sufficient length to enable winding thereof from ring 4 through ring 3 at least three times. This treble winding of the latigo through the rings 3 and 4 effects a block and tackle arrangement whereby the girth strap may be drawn very tightly about the horse. The loose end of the strap 6 is thereafter wound through the looped sections of the latigo and knotted so as to secure the girth strap tightly to thereby hold the saddle in the desired position on the horse's back.

The accessory constituting the present invention is adapted for use in the arrangement just explained and is employed as a linkage between the latigo 6 and the ring 3 of the girth 2. This accessory is best illustrated in Figs. 4 and 5 and is generally designated by reference numeral 10.

The accessory 10 comprises a base 11 of solid leather adapted to lie against the side of the horse to prevent undue chafing of the horse's hide. The base 11 is formed to provide a substantially widened portion 12 terminating in an elongated tapered portion 13.

A multi-looped buckle 15 is disposed on the outer surface of the portion 12 of the base 11. The buckle 15 has a flat bar 16 at its lower end disposed flatly against the base 11, and has a plurality of cross bars 17, 18 and 19 formed at its upper end each disposed in spaced relation with respect to each other.

It should be noted that the upper end of the buckle is offset slightly forwardly of the flat bar 16 so as to leave a space for several thicknesses of the latigo as will later be made apparent.

The flat bar 16 of the buckle is covered by an outer leather facing 20, the upper end 21 of which is secured by stitching 22 to the base 11 within the loop 23 formed between the flat bar 16 and the lower cross bar 17. A pair of rivets 24 extend through the facing 20, flat bar 16 and base 11 to securely fasten the buckle 15 in place.

The balance of the aforementioned leather facing 20 overlies and conforms in shape to the tapered portion 13 of the base 11 and is adequately secured thereto by stitching 25 in the manner as illustrated in Figs. 4 and 5.

It should be noted that the outer leather facing 20 is of substantially the same thickness as the base 11 to give added strength thereto. However, the facing 20 has its edges skived toward the stitching 22 and 25 so that in cross section the tapered portion 13 of the accessory 10 is of a convex configuration as seen in Fig. 6.

The lower or tapered portion 13 of the base 11 and the corresponding portion of facing 20 constitute a long billet 26 providing an adequate handle adapted to be inserted through the girth ring 3 which, for purposes of the present invention, is provided with a tongue 27.

The billet 26 is provided with an elongated opening 28 adjacent the mid section of the accessory 10 and this opening is adapted to receive the tongue 27 of the girth buckle or ring 3.

It should here be noted that a support plate 29 may be disposed between the two layers of leather, 13 and 20 and secured thereto by rivets 29'. This support plate 29 is provided with a recess conforming to the lower margin of the opening 28 to reinforce the same against the thrust exerted by the tongue 27 of the girth ring 3. The load exerted by the tongue 27 and the resistance thereto by the ring 3 against the outer face of the billet 26 when the latter is secured to the girth buckle will flex the billet toward the girth strap as shown in Fig. 1.

The base 11 carries a keeper loop 30 at its upper end, just above the uppermost cross bar 19 of the buckle 15. The loop 30 is of sufficient depth to allow three thicknesses of the latigo 6 to pass through it as best illustrated in Fig. 3. The accessory 10 is initially interposed between the girth strap and latigo and the latter is laced, as illustrated in Fig. 3, through loop 30 and under the uppermost cross bar 19, then back up through the rigging ring 4, down through loop 30 and under the medial cross bar 18. The latigo is then laced through the rigging ring 4 a second time, then down through the keeper loop 30 for the third time and below the lowermost cross bar 17. The billet end 31 of the latigo is provided with a plurality of openings 32 any one of which will receive a tongue 35 pivotally secured to an upset pivot 36 formed on the flat bar 16 of the buckle 15.

After the latigo has been laced through the multi-looped buckle 15 in the foregoing manner, the billet end 31 of the latigo can be pulled to tighten up or "cinch" the girth strap 2 in the usual manner. In this connection it will be noted that the outstanding characteristics of the present invention make for a freer operation of the triple strands of the latigo strap. That is to say, since each lower bight of the several strands of the latigo turns about a separate cross bars 19, 18 and 17, respectively, of a multi-looped buckle 15, frictional resistance between the several strands is minimized. This is further accomplished because of the slight forward disposition of the upper end of the buckle 15 relative to the flat bar 16 thereof. In other words, there will be sufficient clearance between the multi-looped buckle and the several strands of the latigo to prevent undue binding of the latigo beneath the loops of the buckle during cinching of the latigo.

In addition to the foregoing, since the movable strands of the latigo are all backed by the widened portion 12 of the accessory 10, there is less likelihood of pulling of the horse's hair or pinching of its flesh between the portions of the latigo which slide around the respective cross bars of the buckle 15. It will be noted that each cross bar 17, 18 and 19 is concave on that side thereof which engages the lower bight of each strand of the latigo. This concavity of the cross bars effects self centering of the several strands of the latigo and keeps the latter in perfect alignment to thus assure against loosening thereof by reason of subsequent straightening of the latigo strands.

The foregoing characteristics of the multi-looped buckle 15 also tend to keep the latigo neat in appearance and eliminate any undue knotting or bulging thereof and thereby gives greater comfort to the rider as well as the horse. After the latigo has been tightened in the manner just explained its billet end 31 is buckled to the tongue 35 associated with the flat bar 16 of the buckle 15. Thereafter, the latigo can remain in cinched position as shown and the saddle dismounted by detaching the long billet 26 of the accessory 10 from the girth buckle or ring 3. Consequently a good deal of time will be saved because the latigo need not be rewound and tightened up each time the saddle is to be secured to the horse.

With the present invention one need only buckle the long billet 26 of the accessory 10 to the girth buckle 3. If the girth strap 2 is not tight enough, the latigo need only be adjusted by unbuckling its billet end 31, pulling on the same and rebuckling the same, i. e., a different hole 32 thereof, relative to the tongue 35 of the buckle 15.

From the foregoing it will be apparent that I have provided a novel accessory for the rigging of saddles and while the structure of the accessory has been described in specific detail herein, it will be apparent that the same is susceptible to variations, alterations and modifications without departing from the spirit of the invention thereof. I therefore desire to avail myself of all variations, alterations and/or modifications in construction which fall within the scope of the invention as set forth in the appended claims.

What I claim as new and desire to protect by Letters Patent is:

1. A cinch strap accessory for attaching the latigo strap of saddle rigging to the girth buckle thereof comprising a leather base having a main portion terminating in a tapered billet, a multi-ring buckle having its lower flat bar secured to the main portion of said base, said buckle having a plurality of cross bars offset from the main portion of said base for facilitating lacing of a separate strand of said latigo under each of said cross bars, each said cross bar being concave where it engages the respective strand of said latigo for maintaining all strands thereof in centered relation with respect to said buckle, means on the buckle for securing the free end of said latigo thereto, said tapered billet of said leather base having an elongated opening therein adapted to receive the tongue of said girth buckle.

2. As an article of manufacture, a rigging accessory comprising an elongated base of pliable material having a main portion terminating in a tapered billet provided with a tongue receiving opening, a buckle having a flat bar and a plurality of cross bars concave in configuration on that side thereof which is contiguous to said flat bar, and means for securing said flat bar to the main portion of said base.

3. An article of manufacture comprising an elongated base having a main portion terminating in a tapered billet, a buckle adapted to lie upon the main portion of said base and including a plurality of attaching rings and a flat cross bar offset toward said base, a leather facing overlying the tapered billet of said base, the flat cross bar of said buckle and a substantial portion of the main portion of said base, said facing and billet having aligned openings adapted to receive the tongue of an attaching buckle, a support plate disposed between said base and facing at the tongue engaging margin of the aligned openings of the billet and facing, and means for securing said flat cross bar, support plate and facing to the base.

4. An article of manufacture comprising an elongated base having a main portion terminating in a tapered billet, a buckle adapted to lie upon the main portion of said base and including a plurality of attaching rings and a flat cross bar offset toward said base, a leather facing overlying the tapered billet of said base, the flat cross bar of said buckle and a substantial portion of the main portion of said base, said facing and billet having aligned openings adapted to receive the tongue of an attaching buckle, a support plate disposed between said base and facing at the tongue engaging margin of the aligned openings of the billet and facing, said facing having its marginal edges secured to said base by stitching, and means for securing said flat cross bar and said support plate to said facing and base.

5. An article of manufacture comprising an elongated base having a main portion terminating in a tapered billet, a buckle adapted to lie upon the main portion of said base and including a plurality of attaching rings and a flat cross bar offset toward said base, a leather facing overlying the tapered billet of said base, the flat cross bar of said buckle and a substantial portion of the main portion of said base and having its under surface skived so as to taper down toward its marginal edges, said facing and billet having aligned openings adapted to receive the tongue of an attaching buckle, a support plate disposed between said base and facing at the tongue engaging margin of the aligned openings of the billet and facing, rivet means for securing said flat cross bar, support plate and facing to the base, and stitching along the marginal edges of said facing at the tapered billet, above the flat cross bar of said buckle and around the aligned openings in said facing and billet.

ROBERT MICHAEL SMITH.

REFERENCES CITED

The following references are of record in the file of this patent:

UNITED STATES PATENTS

| Number | Name | Date |
|---|---|---|
| 481,180 | Lane | Aug. 23, 1892 |
| 539,461 | Weeks | May 21, 1895 |